United States Patent
Schofield et al.

(10) Patent No.: US 6,659,711 B2
(45) Date of Patent: Dec. 9, 2003

(54) METHODS AND APPARATUS FOR REGULATING TURBINE COOLING AIRFLOW SUPPLY SYSTEMS

(75) Inventors: Ronald Bruce Schofield, Clarksville, OH (US); Robert David Perry, Pleasant Plain, OH (US); Eileen Mary Corcoran, Loveland, OH (US)

(73) Assignee: General Electric Co., Schenectady, NY (US)

( * ) Notice: Subject to any disclaimer, the term of this patent is extended or adjusted under 35 U.S.C. 154(b) by 49 days.

(21) Appl. No.: 09/999,272

(22) Filed: Nov. 15, 2001

(65) Prior Publication Data

US 2003/0091428 A1 May 15, 2003

(51) Int. Cl.[7] ............................................. F01D 17/00
(52) U.S. Cl. ........................................ 415/1; 415/146
(58) Field of Search ........................ 415/1, 146, 169.1, 415/175, 176; 137/512, 527.8

(56) References Cited

U.S. PATENT DOCUMENTS

| | | | |
|---|---|---|---|
| 4,178,638 A | * | 12/1979 | Meyer ..................... 137/512 X |
| 4,813,481 A | * | 3/1989 | Sproul et al. ......... 137/527.8 X |
| 5,044,396 A | * | 9/1991 | Daudet et al. ......... 137/527.8 X |
| 5,078,739 A | * | 1/1992 | Martin .................... 137/512 X |
| 5,176,171 A | | 1/1993 | Andersson |
| 5,318,407 A | | 6/1994 | Davis |
| 5,356,268 A | | 10/1994 | Lengyel et al. |
| D364,210 S | | 11/1995 | Loerop et al. |
| 6,050,079 A | * | 4/2000 | Durgin et al. .......... 415/115 X |

FOREIGN PATENT DOCUMENTS

| | | |
|---|---|---|
| DE | 29807895 U1 | 9/1998 |
| FR | 2 584 162 | 6/1985 |
| JP | 09280072 | 10/1997 |

* cited by examiner

Primary Examiner—Edward K Look
Assistant Examiner—Richard A Edgar
(74) Attorney, Agent, or Firm—Armstrong Teasdale LLP; Robert B. Reeser, III

(57) ABSTRACT

A check valve includes a valve housing and at least one control member. The valve housing includes a sidewall and an opening extending therethrough. The sidewall defines the opening and includes at least one recess formed therein. Each control member is rotatably coupled to the valve housing within the sidewall recess, and each control member is configured to allow flow of fluid through the valve opening in a first direction. Each control member is further configured to substantially prevent flow of fluid through the valve opening in a second direction that is opposite the first direction.

20 Claims, 4 Drawing Sheets

METHODS AND APPARATUS FOR REGULATING TURBINE COOLING AIRFLOW SUPPLY SYSTEMS

BACKGROUND OF THE INVENTION

This invention relates generally to gas turbine engines and more particularly, to cooling systems used to supply cooling air to gas turbine engine components.

Gas turbine engines typically include cooling systems to supply cooling air to components exposed to high temperatures. For example, at least some known gas turbine engines include cooling systems which supply air to pressurized sumps. More specifically, within such engines, a pair of ducts are used to route cooling air from a compressor stage to cooling plates positioned within the sumps.

During engine operation, the cooling air facilitates preventing an operating temperature of the cooling plates from increasing as a result of exposure to heat generated by the engine. The ducts may also be exposed to vibrational stresses induced by the engine during engine operation. Over time, continued exposure to the vibrational and thermal stresses may damage one of the cooling supply ducts. More specifically, such stresses may cause duct breaks. Depending on a severity of the damage to the duct, the cooling air may flow through the duct break rather than into the sump. Furthermore, because the sump is pressurized, cooling air supplied to the sump by the other duct may be exhausted from the sump through the broken duct, thus increasing an operating temperature of the cooling plates. Over time, continued exposure to the higher operating temperatures may damage the cooling plates.

BRIEF SUMMARY OF THE INVENTION

In one aspect, a check valve is provided. The check valve includes a valve housing and at least one control member. The valve housing includes a sidewall and an opening extending therethrough. The sidewall defines the opening and includes at least one recess formed therein. Each control member is rotatably coupled to the valve housing within the sidewall recess, and each control member is configured to allow flow of fluid through the valve opening in a first direction. Each control member is further configured to substantially prevent flow of fluid through the valve opening in a second direction that is opposite the first direction.

In another aspect, a method for operating a gas turbine engine is provided. The method includes directing fluid downstream from a cooling air supply duct through a check valve that includes a hollow valve housing including a sidewall that has a recess formed therein and at least one control member that is rotatably coupled to the check valve within the recess. The method also includes preventing fluid from flowing upstream into the supply duct with the check valve.

In a further aspect, a gas turbine engine cooling air supply system is provided. The cooling air supply system includes a cooling air supply duct including an end, and a check valve. The check valve is coupled to the cooling air supply duct end and is configured to permit fluid flow from the cooling air supply duct while substantially preventing fluid flow into the cooling air supply duct, and includes a hollow valve housing and at least one control member. The valve housing includes a sidewall and an opening that extends therethrough. The sidewall defines the opening and includes at least one recess formed therein. The control member is rotatably coupled to the valve housing within the sidewall recess.

DETAILED DESCRIPTION OF THE INVENTION

Figure 1:
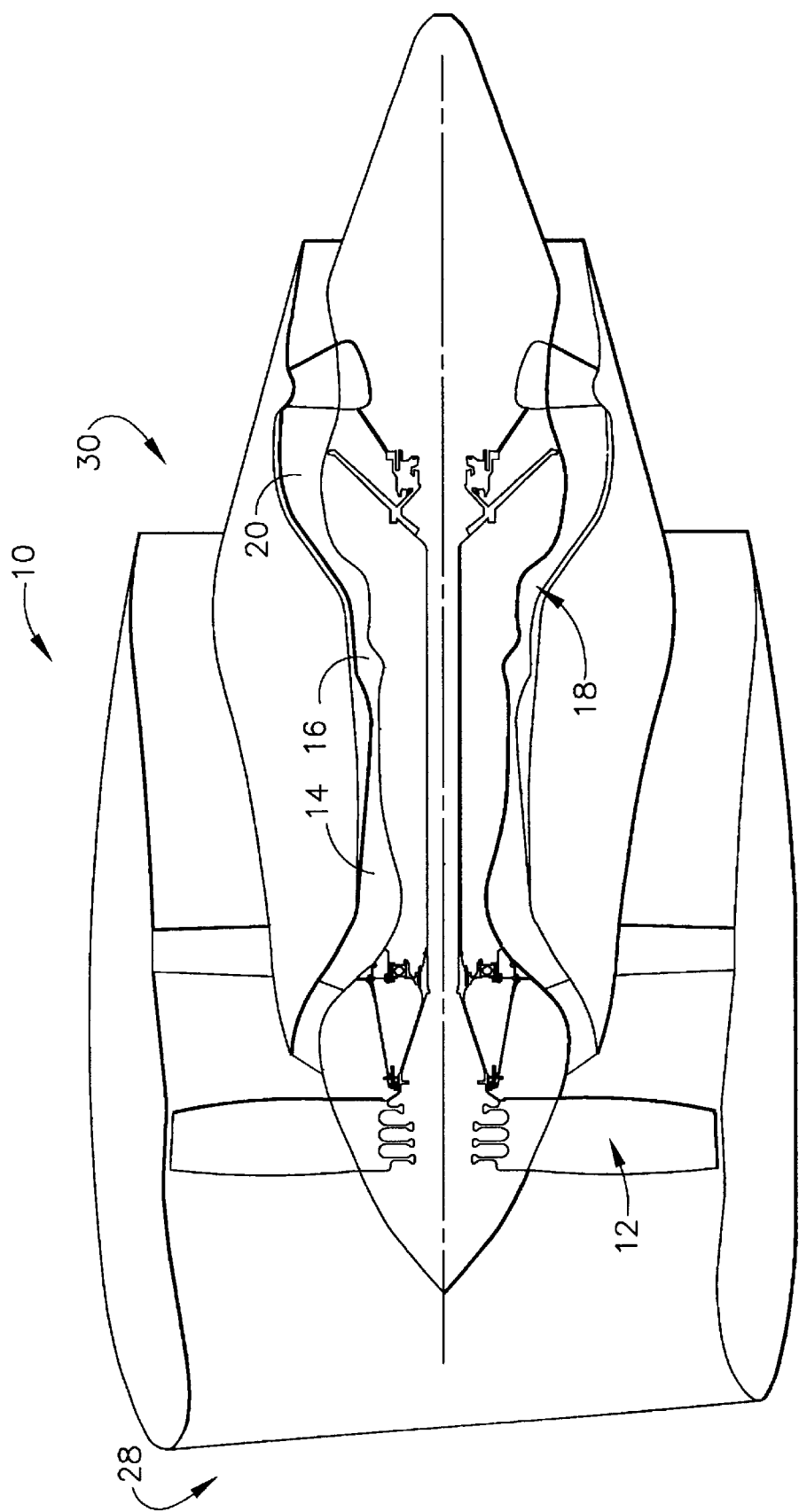
FIG. 1 is a schematic illustration of a gas turbine engine.

FIG. 1 is a schematic illustration of a gas turbine engine 10 including a fan assembly 12, a high-pressure compressor 14, and a combustor 16. Engine 10 also includes a high-pressure turbine 18 and a low-pressure turbine 20. Engine 10 has an intake side 28 and an exhaust side 30. In one embodiment, engine 10 is a CF-34 engine commercially available from General Electric Aircraft Engines, Cincinnati, Ohio. Engine 10 includes a sump (not shown) which is pressurized and cooled with cooling air. In one embodiment, air is routed from a fourth stage of compressor 14 for cooling the sump.

In operation, air flows through fan assembly 12 and compressed air is supplied to compressor 14. The compressed air is delivered to combustor 16. Airflow from combustor 16 drives turbines 18 and 20, and turbine 20 drives fan assembly 12.

Figure 2:
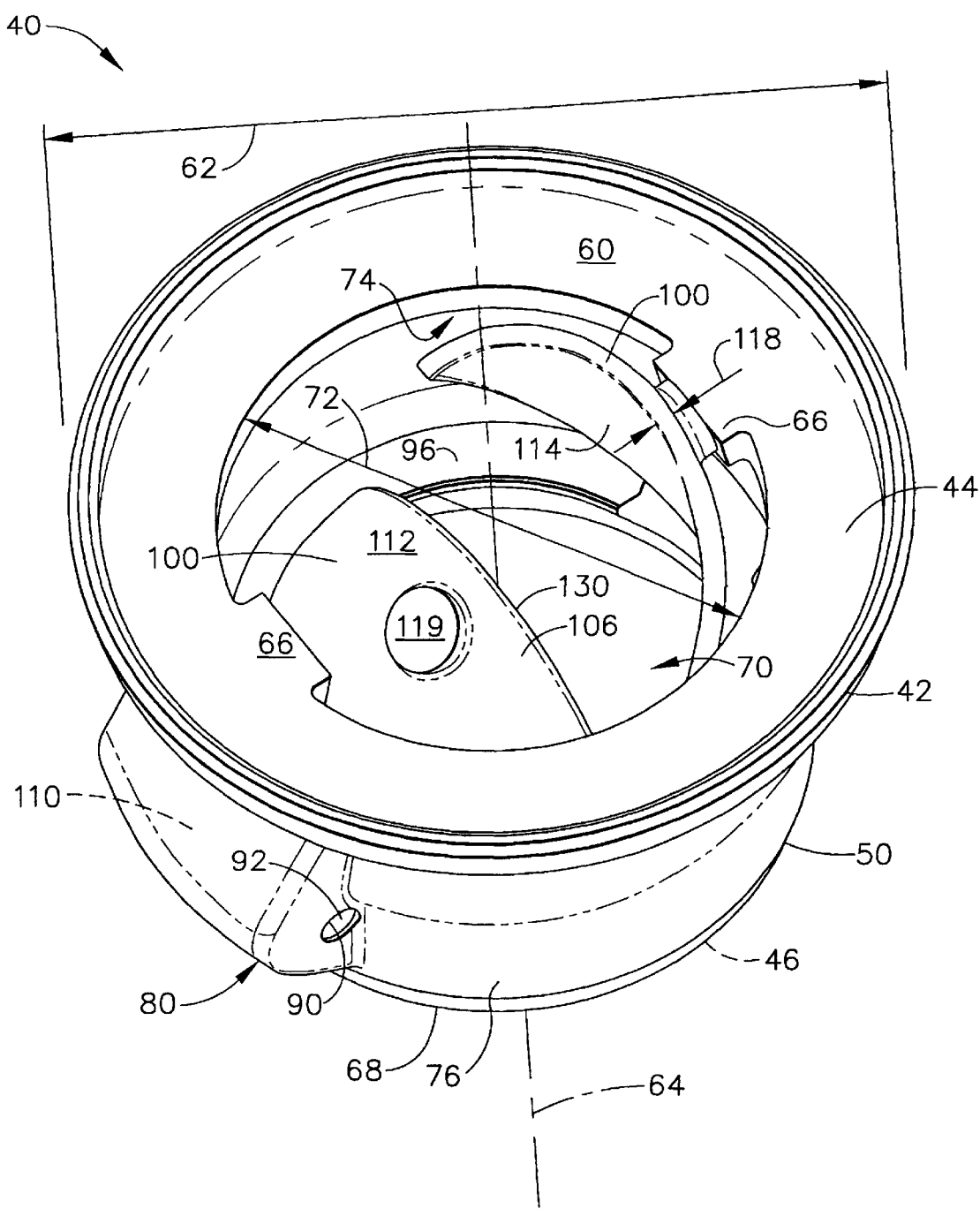
FIG. 2 is perspective view of a check valve that may be used with the engine shown in FIG. 1.

FIG. 2 is perspective view of a check valve 40 that may be used to regulate fluid flow on a gas turbine engine, such as engine 10 (shown in FIG. 1). More specifically, in one embodiment, valve 40 is utilized within a cooling air supply system (not shown in FIG. 2) to supply cooling air from a compressor, such as compressor 14 (shown in FIG. 1) to a downstream engine sump (not shown). Valve 40 is hollow and includes a housing 42 including a downstream end 44, an upstream end 46, and a sidewall 50 extending therebetween.

Housing downstream end 44 includes an integral flange 60 which may be used to couple valve 40 to an engine component (not shown). Flange 60 extends radially outwardly from a centerline axis of symmetry 64 of valve 40, such that flange 60 has an outer diameter 62 that is larger than an outer diameter (not shown in FIG. 2) of housing upstream end 46. In the exemplary embodiment, flange 60 is substantially circular. Flange 60 includes a pair of stops 66 that extend radially inwardly towards centerline axis of symmetry 64. Stops 66 are diametrically opposed and are identical.

Housing upstream end 46 includes a lip 68 that is used to couple valve 40 to a cooling supply duct or tube (not shown in FIG. 2). In the exemplary embodiment, lip 68 is substantially circular and is welded to the cooling supply duct. More specifically, lip 68 enables valve 40 to be coupled to the cooling supply duct such that an orientation of valve 40 with respect to the duct geometry is maintained.

Sidewall 50 is substantially cylindrical and defines an opening 70 that extends between housing downstream and upstream end 44 and 46, respectively. In the exemplary embodiment, at housing ends 44 and 46, opening 70 is substantially circular, and has a diameter 72 at each end 44 and 46. Sidewall 50 includes an interior surface 74 and an exterior surface 76. Valve opening 70 is defined by sidewall interior surface 74.

A pair of recesses 80 are formed by sidewall 50. Recesses 80 are identical and are diametrically opposed. In the exemplary embodiment, recesses 80 are substantially aligned with respect to flange stops 66. Each recess 80 extends radially outwardly from valve centerline axis of symmetry 64. In the exemplary embodiment, each recess 80 has a substantially triangular cross-sectional profile. Each recess 80 includes a pair of openings 90 that extend through sidewall 50. More specifically, openings 90 are substantially aligned with respect to each other, and are each sized to receive a hinge pin 92 therethrough.

A ledge 96 extends radially inward from sidewall 50. More specifically, ledge 96 extends radially inward from sidewall interior surface 74. Ledge 96 does not extend circumferentially within sidewall interior surface 74, but rather extends arcuately between recesses 80.

A pair of control members or petals 100 are coupled to valve 40 within recesses 80. Members 100 are identical and are rotatably coupled to valve 40 with hinge pins 92. Accordingly, members 100 are rotatable between a fully-closed position (not shown in FIG. 2) and a fully-open position (not shown in FIG. 2). Accordingly, members 100 include a flapper portion 106 which extends across valve opening 70, and an attachment portion 110 which extends into each respective sidewall recess 80.

Each control member portion 106 is substantially semi-circular and includes an upper surface 112 and a lower surface 114. Members 100 are contoured and accordingly, each portion 106 is not planar. In one embodiment, each member portion 106 is substantially semi-spherical. In the exemplary embodiment, each member lower surface 114 is contoured with respect to each member upper surface 112 such that a thickness 118 of each member portion 106 remains substantially capable of withstanding operating mechanical loads. A projection 119 extends from each control member upper surface 112 for contacting a respective flange stop 66 when a respective member 100 is in the fully-open position.

Figure 3:
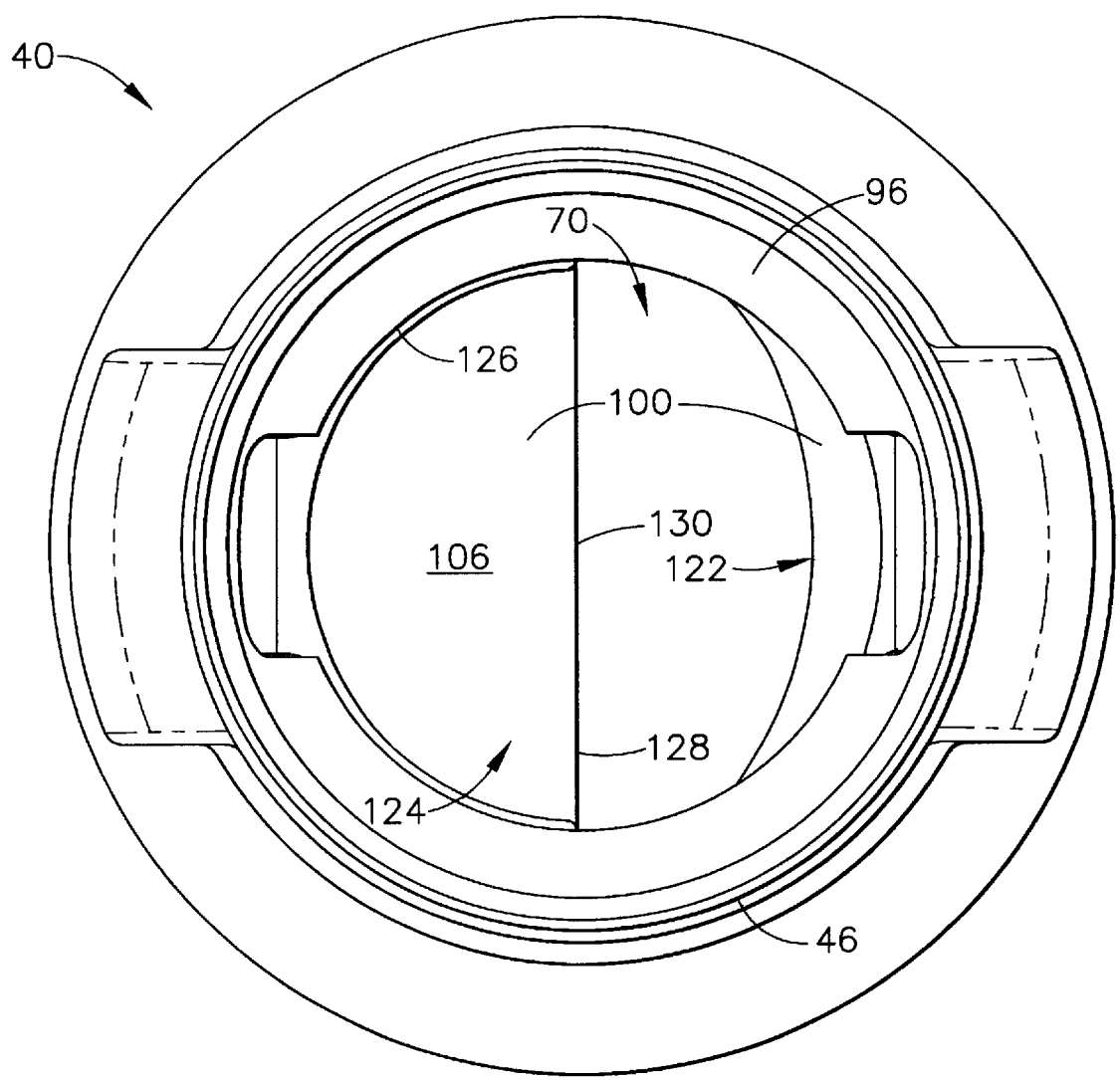
FIG. 3 is a plan view of the check valve shown in FIG. 2.
Figure 4:
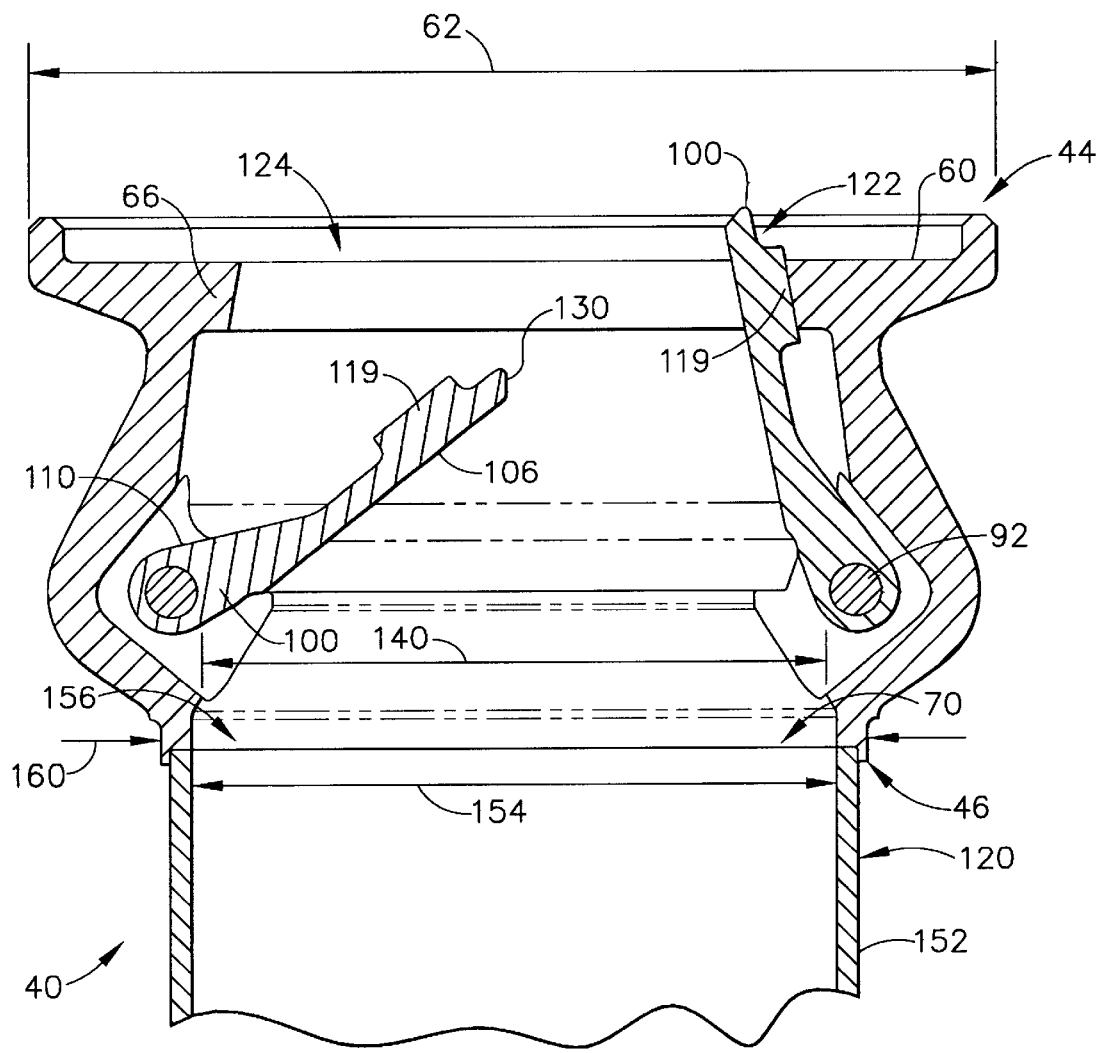
FIG. 4 is a cross-sectional schematic view of the check valve shown in FIG. 2 and coupled to a cooling air supply duct.

FIG. 3 is a plan view of check valve 40 viewed towards valve housing upstream end 46. FIG. 4 is a cross-sectional schematic view of the check valve 40 coupled to a cooling air supply system 120. More specifically, within FIG. 3, a control member 100 is in a fully-open position 122, and the other control member 100 is in a fully-closed position 124. When each control member 100 is in the fully-closed position 124, an outer perimeter portion 126 of each member portion 106 is positioned adjacent each respective sidewall ledge 96, and a center perimeter portion 128 extends substantially diametrically across valve opening 70. Center perimeter portion 128 includes a tapered outer edge 130 which enables the member center perimeter portions 128 of each respective member portion 106 to mate substantially flush against each other when members 100 are in the fully-closed position 124.

When each control member 100 is in the fully-open position 122, each respective member projection 119 is positioned against each respective flange stop 66. Flange 60 has an outer diameter 62 that is larger than an outer diameter 140 of housing upstream end 46. Moreover, when each control member 100 is in the fully-open position 122, the curved contour of each respective control member portion 106 facilitates increasing a valve effective area for valve 40 in comparison to valves which include substantially planar valve petals.

Valve 40 is then coupled within a cooling air supply system 120 to supply cooling air to downstream engine components (not shown). More specifically, in the exemplary embodiment, cooling air supply system 120 includes a supply duct 152 used to route cooling air from a compressor, such as compressor 14 (shown in FIG. 1) downstream to cooling plates (not shown) positioned downstream of a gas turbine engine sump (not shown). Duct 152 has a diameter 154 at an exit end 156 of duct 152 that is slightly smaller than an outer diameter 160 of housing upstream end 46. Accordingly, when housing upstream end lip 68 is welded to duct end 156, an orientation of valve 40 is fixed with respect to duct 152. Moreover, because valve upstream end 46 is only slightly larger than duct diameter 154, the design of valve 40 is considered compact, and existing engine hardware does not require modification to accommodate an increased diameter 140 of valve 40.

During assembly of valve 40, each hinge pin 92 is inserted through a respective sidewall recess opening 90 and through a respective control member 100. Hinge pins 92 are then welded to securely couple each control member 100 within valve 40. In the exemplary embodiment, hinge pins 92 may be removed to facilitate replacing control members 100. Furthermore, because valve 40 is fixedly coupled to duct 152, the orientation of valve 40 is maintained, thus facilitating reducing valve petal flutter and failure, and increasing a useful life of valve 40.

During operation, as fluid flows downstream through supply duct 152 and into valve 40, fluid pressure forces control members 100 to rotate from fully-closed position 124 to open position 122. More specifically, fluid pressure forces each members 100 to rotate until each respective member projection 119 contacts a respective flange stop 66. Because each member portion 106 is curved, and because each member is coupled to valve 40 within a respective sidewall recess 80, a valve effective area is facilitated to be increased. Furthermore, the curved contour of each member 100 facilitates reducing fluid blockage through valve 40. As a result, pressure drops across valve 40 are facilitated to be reduced, and flow loss margins within valve 40 are facilitated to be maintained.

Furthermore, when fluid flow is reversed through a supply duct 152, or if a supply duct fails upstream from valve 40, control members 100 rotate to the fully-closed position 124 and fluid is substantially prevented from flowing upstream through valve 40, or from valve downstream end 44 to valve upstream end 46.

The above-described check valve is cost-effective and highly reliable. The check valve includes a pair of control members that include contoured control members. The contoured control members define a blockage area within the valve that is smaller than that of other known check valves, and as such, facilitate reducing pressure losses of fluids flowing through the valve. Accordingly, the fluid is discharged from the check valve with reduced pressure drops across the valve. Furthermore, the check valve substantially prevents fluid from flowing upstream through the valve. As a result, a reliable and cost-effective check valve is provided.

While the invention has been described in terms of various specific embodiments, those skilled in the art will recognize that the invention can be practiced with modification within the spirit and scope of the claims.

What is claimed is:

1. A method for operating a gas turbine engine, said method comprising:

directing fluid downstream from a cooling air supply duct through a check valve that includes a hollow valve housing including a sidewall that has a recess formed therein and at least one control member that is pivotably coupled to the check valve within the recess; and preventing fluid from flowing upstream into the supply duct with the check valve.

2. A method in accordance with claim 1 wherein directing fluid downstream from a cooling air supply duct through a check valve further comprises directing fluid through a check valve including at least one control member that facilitates reducing system pressure drop through the check valve.

3. A method in accordance with claim 1 wherein directing fluid downstream from a cooling air supply duct through a check valve further comprises directing fluid through a check valve including at least one control member that facilitates increasing a valve effective area through the check valve.

4. A method in accordance with claim 1 wherein directing fluid downstream from a cooling air supply duct through a check valve further comprises directing fluid through a check valve including at least one control member including a contoured upstream side and a contoured downstream side.

5. A method in accordance with claim 4 wherein directing fluid downstream from a cooling air supply duct through a check valve further comprises directing fluid through a check valve including a pair of mating control members.

6. A check valve for a gas turbine engine cooling air supply system, said check valve comprising:

a valve housing comprising a sidewall and an opening extending therethrough, said sidewall defining said opening and comprising at least one recess therein;

and at least one control member pivotably coupled to said valve housing within said sidewall recess, said control member configured to allow flow of fluid into the gas turbine engine cooling air supply system through said valve opening in a first direction, and further configured to substantially prevent flow of fluid through said valve opening in a second direction opposite said first direction.

7. A check valve in accordance with claim 6 wherein at least a portion of said at least one control member is configured to be substantially flush against an inner surface of said valve housing sidewall.

8. A check valve in accordance with claim 6 wherein at least a portion of said at least one control member is configured to extend at least partially across said housing opening to prevent fluid flow through said housing opening in said second direction.

9. A check valve in accordance with claim 6 wherein said at least one control member comprises a first control member and a second control member, said first and second control members identical and configured to mate to substantially prevent flow of fluid through said valve opening in said second direction.

10. A check valve in accordance with claim 6 wherein said opening has a substantially circular cross-sectional profile, said at least one control member comprises a first control member and an identical second control member.

11. A check valve in accordance with claim 6 wherein said at least one control member has a substantially semi-circular cross-sectional profile.

12. A check valve in accordance with claim 6 wherein said at least one control member comprises a lower surface and an upper surface, at least one of said lower and upper surfaces is contoured.

13. A check valve in accordance with claim 12 wherein said control member upper surface is substantially parallel with said control member lower surface.

14. A gas turbine engine cooling air supply system comprising:

a cooling air supply duct comprising an end; and a check valve coupled to said cooling air supply duct end and configured to permit fluid flow from said cooling air supply duct while substantially preventing fluid flow into said cooling air supply duct, said check valve comprising a hollow valve housing and at least one control member, said valve housing comprising a sidewall and an opening extending therethrough, said sidewall defining said opening and comprising at least one recess formed therein, said at least one control member is pivotably coupled to said valve housing within said sidewall recess.

15. A cooling air supply system in accordance with claim 14 wherein said at least one check valve control member comprises an upstream surface and a downstream surface, at least one of said upstream and said downstream surfaces is contoured.

16. A cooling air supply system in accordance with claim 15 wherein at least a portion of said at least one check valve control member is configured to be substantially flush against an inner surface of said valve housing sidewall when said at least one control member is positioned to substantially prevent fluid flow into said cooling air supply duct.

17. A cooling air supply system in accordance with claim 15 wherein said at least one check valve control member comprises a pair of identical control members configured to mate to substantially prevent fluid flow into said cooling air supply duct.

18. A cooling air supply system in accordance with claim 17 wherein said check valve housing opening is substantially circular, each said check valve control member has a substantially semi-circular cross-sectional profile.

19. A cooling air supply system in accordance with claim 15 wherein each said check valve control member comprises an upper surface and a lower surface, at least one of said control member lower and upper surfaces is contoured.

20. A cooling air supply system in accordance with claim 19 wherein said at least one check valve control member upper surface is substantially parallel with each said respective control member lower surface.

* * * * *